(12) United States Patent
Alfredsson et al.

(10) Patent No.: US 8,317,266 B2
(45) Date of Patent: Nov. 27, 2012

(54) VEHICLE SEAT

(75) Inventors: Adam Alfredsson, Vaenersborg (SE);
Christer Andersson, Trollhattan (SE);
Odd Jaegtnes, Nygard (SE)

(73) Assignee: Lear Corporation, Southfield, MI (US)

( * ) Notice: Subject to any disclaimer, the term of this patent is extended or adjusted under 35 U.S.C. 154(b) by 358 days.

(21) Appl. No.: 12/742,307

(22) PCT Filed: Dec. 18, 2008

(86) PCT No.: PCT/US2008/087312
§ 371 (c)(1),
(2), (4) Date: May 11, 2010

(87) PCT Pub. No.: WO2009/085887
PCT Pub. Date: Jul. 9, 2009

(65) Prior Publication Data
US 2010/0283303 A1 Nov. 11, 2010

Related U.S. Application Data (60) Provisional application No. 61/008,805, filed on Dec. 21, 2007.

(51) Int. Cl.
*A47C 1/00* (2006.01)
(52) U.S. Cl. .......... 297/344.15; 297/344.14; 297/216.17
(58) Field of Classification Search .................. 297/277, 297/216.17, 344.15, 344.16, 281, 344.12, 297/452.49, 353; 248/419, 420, 589, 580, 248/581, 593, 596, 598, 324, 329
See application file for complete search history.

(56) References Cited

U.S. PATENT DOCUMENTS

| | | | |
|---|---|---|---|
| 1,356,558 A | | 10/1920 | Purcell |
| 1,774,555 A | * | 9/1930 | Horsley et al. ............... 248/581 |
| 2,707,986 A | * | 5/1955 | Johnson ....................... 248/583 |
| 3,139,304 A | * | 6/1964 | Lehner et al. ................ 297/308 |
| 3,326,603 A | | 6/1967 | Lehner ......................... 297/308 |
| 3,572,828 A | * | 3/1971 | Lehner ......................... 297/308 |
| 3,592,422 A | * | 7/1971 | Paine et al. .................. 248/589 |
| 3,632,167 A | | 1/1972 | Sinfield |
| 3,669,400 A | * | 6/1972 | Lowe ........................... 248/550 |
| 3,861,637 A | * | 1/1975 | DeLongchamp ............ 248/576 |
| 3,954,298 A | * | 5/1976 | Lowe ........................... 297/308 |
| 3,985,388 A | | 10/1976 | Hogan |
| 4,616,874 A | * | 10/1986 | Pietsch et al. ................ 297/321 |
| 4,662,597 A | * | 5/1987 | Uecker et al. ............... 248/564 |
| 4,817,908 A | * | 4/1989 | Hanlon et al. ............... 248/564 |
| 4,828,216 A | * | 5/1989 | Van Duser .................... 248/585 |
| 4,838,514 A | * | 6/1989 | Hill .............................. 248/577 |
| 5,176,356 A | * | 1/1993 | Lorbiecki et al. ............ 248/577 |
| 5,251,864 A | | 10/1993 | Itou |

(Continued)

FOREIGN PATENT DOCUMENTS

EP 562453 A1 * 9/1993

(Continued)

*Primary Examiner* — David Dunn
*Assistant Examiner* — David E Allred
(74) *Attorney, Agent, or Firm* — Brooks Kushman P.C.

(57) ABSTRACT

A vehicle seat (10) includes a support frame (12) that mounts a suspension frame (22) by a spring suspension (29) under the operation of a control lever (32) and a slide assembly (38) for providing suspension of the seat and horizontal positioning.

17 Claims, 5 Drawing Sheets

U.S. PATENT DOCUMENTS

| | | |
|---|---|---|
| 2,712,346 A | 7/1995 | Sprinkle |
| 5,520,440 A | 5/1996 | Lee |
| 5,601,338 A | 2/1997 | Wahls |
| 5,871,198 A | 2/1999 | Bostrom et al. |
| 6,644,737 B2 | 11/2003 | Kohl et al. |
| 6,699,146 B1 | 3/2004 | Winter et al. |
| 6,830,297 B2 | 12/2004 | Gordon |
| 7,070,153 B1 * | 7/2006 | Stenard .......................... 248/157 |
| 7,926,769 B2 * | 4/2011 | Stenard .......................... 248/157 |
| 2004/0189078 A1 | 9/2004 | Andersson et al. |
| 2005/0127730 A1 * | 6/2005 | Bischoff .................. 297/344.12 |
| 2007/0035167 A1 * | 2/2007 | Meyer ...................... 297/344.19 |
| 2012/0241234 A1 * | 9/2012 | Wright ....................... 180/65.51 |

FOREIGN PATENT DOCUMENTS

| | | | |
|---|---|---|---|
| JP | 57007724 A | * | 1/1982 |
| WO | 2009085887 A2 | | 7/2009 |
| WO | 2009085887 A3 | | 7/2009 |

* cited by examiner

Fig. 8 ial application Ser. No. 61/008,805, filed Dec. 21, 2007, which is

VEHICLE SEAT

CROSS-REFERENCE TO RELATED APPLICATIONS

This application claims the benefit of U.S. provisional application Ser. No. 61/008,805, filed Dec. 21, 2007, which is hereby incorporated by reference in its entirety.

BACKGROUND OF THE INVENTION

1. Field of the Invention

This invention relates to a vehicle seat having a vehicle mounted support frame including a bottom frame portion and a connected upstanding back frame portion and also having a suspension frame including a bottom seating portion and a pivotally connected backrest that are spring suspended on the support frame for vertical movement that is horizontally controlled.

2. Background Art

Conventional seats used in automobiles, trucks and other vehicles include a vehicle mounted support frame and spring and padding that are upholstered with cloth, leather or vinyl. More recent seats also include foam and other engineered material to eliminate or reduce inner spring usage. Normally the entire seat is covered by upholstery to provide an aesthetically appealing appearance.

U.S. Pat. No. 6,811,227 Andersson et al. discloses a vehicle seat having a vehicle mounted support frame on which a bottom shell and a pivotally connected backrest portion are suspended by springs.

Other vehicle seats are disclosed by U.S. Pat. No. 1,356,558 Purcell; U.S. Pat. No. 2,712,346 Sprinkle; U.S. Pat. No. 3,632,167 Sinfield; U.S. Pat. No. 5,251,864 Itow; U.S. Pat. No. 5,520,440 Lee; U.S. Pat. No. 5,601,338 Wahls; U.S. Pat. No. 5,871,198 Bostrom; U.S. Pat. No. 6,644,737 Kohl et al.; and U.S. Pat. No. 6,830,297 Gordon.

SUMMARY OF THE INVENTION

An object of the present invention is to provide an improved vehicle seat.

In carrying out the above object, a vehicle seat constructed in accordance with the invention includes a support frame having a bottom frame portion for mounting in a generally horizontal orientation on an associated vehicle floor, a back frame portion, and a connection for mounting the back frame portion on the bottom frame portion in a generally upstanding orientation. A suspension frame of the seat has a bottom seating portion, a backrest and a pivotal connection that pivotally mounts the backrest on the bottom seating portion for pivotal movement with respect to the bottom seating portion. A spring suspension suspends the bottom seating portion of the suspension frame on the bottom frame portion of the support frame for vertical movement. A control lever has at least one pivotal connection to the bottom frame portion of the support frame and a pivotal connection to the bottom seating portion of the suspension frame to provide horizontal positioning of the bottom seating portion upon vertical movement of the suspension frame, and a slide assembly extends between the backrest of the suspension frame and the back frame portion of the support frame to provide horizontal positioning of the backrest upon vertical movement of the suspension frame.

As disclosed, the connection between the back frame portion and the bottom frame portion of the support frame includes a recliner that permits adjustable pivotal positioning of the back frame portion with respect to the bottom frame portion.

The spring suspension disclosed includes four springs for suspending the bottom seating portion of the suspension frame at spaced corner locations on the bottom frame portion of the support frame for vertical movement. More specifically, the four springs are disclosed as helical springs each of which has a first end connected to the bottom frame portion of the support frame and a second end connected to the bottom seating portion of the suspension frame. The bottom seating portion of the suspension frame includes a connection wire structure that extends downwardly therefrom and has lower connection locations at which the second ends of the helical springs are connected.

The control lever as disclosed includes a pair of control arms that define a generally V shape having a pair of spaced pivotal connections to the bottom frame portion of the support frame and a vertex having the pivotal connection to the bottom seating portion of the suspension frame. The vertex of the pair of control arms of the control lever as disclosed includes a connection rod that extends horizontally from the bottom seating portion of the suspension frame and has a distal extremity that extends vertically, and the pair of control arms of the control lever have oversize holes that receive the vertically extending distal extremity of the connection rod. Also, the pair of spaced pivotal connections of the pair of control arms of the control lever to the bottom frame portion of the support frame are disclosed as being at rearward locations with respect to the seat, and the pivotal connection the vertex of the pair of control arms to the bottom seating portion of the suspension frame is at a forward location with respect to the seat.

The slide assembly of the seat as disclosed includes a slideway on the back frame portion of the support frame and a slide mounted on the backrest of the suspension frame and slidably supported on the slideway to provide horizontal positioning of the backrest upon vertical movement of the suspension frame. More specifically, the bottom frame portion and the back frame portion of the support frame as disclosed each have a U shape that respectively open rearwardly and generally downwardly with respect to the seat, and the U-shaped back frame portion of the support frame includes a pair of laterally spaced upper slideways of the slide assembly. Furthermore, the bottom seating portion and the backrest of the suspension frame as disclosed also each have a U shape that respectively open rearwardly and generally downwardly with respect to the seat, and the U-shaped backrest of the suspension frame has a pair of laterally spaced upper slides received by the laterally spaced upper slideways of the U-shaped back frame of the support frame to guide the backrest of the suspension frame during vertical movement.

The vehicle seat as disclosed also includes a backrest spring that extends between the back frame portion of the support frame and the backrest of the suspension frame to provide further suspension of the suspension frame on the support frame. This backrest spring is disclosed as being a gas spring that also provides damping of the movement of the suspension frame on the support frame.

The objects, features and advantages of the present invention are readily apparent from the following detailed description of the preferred embodiment when taken in connection with the accompanying drawings.

DETAILED DESCRIPTION OF THE PREFERRED EMBODIMENT

Figures 1, 2:
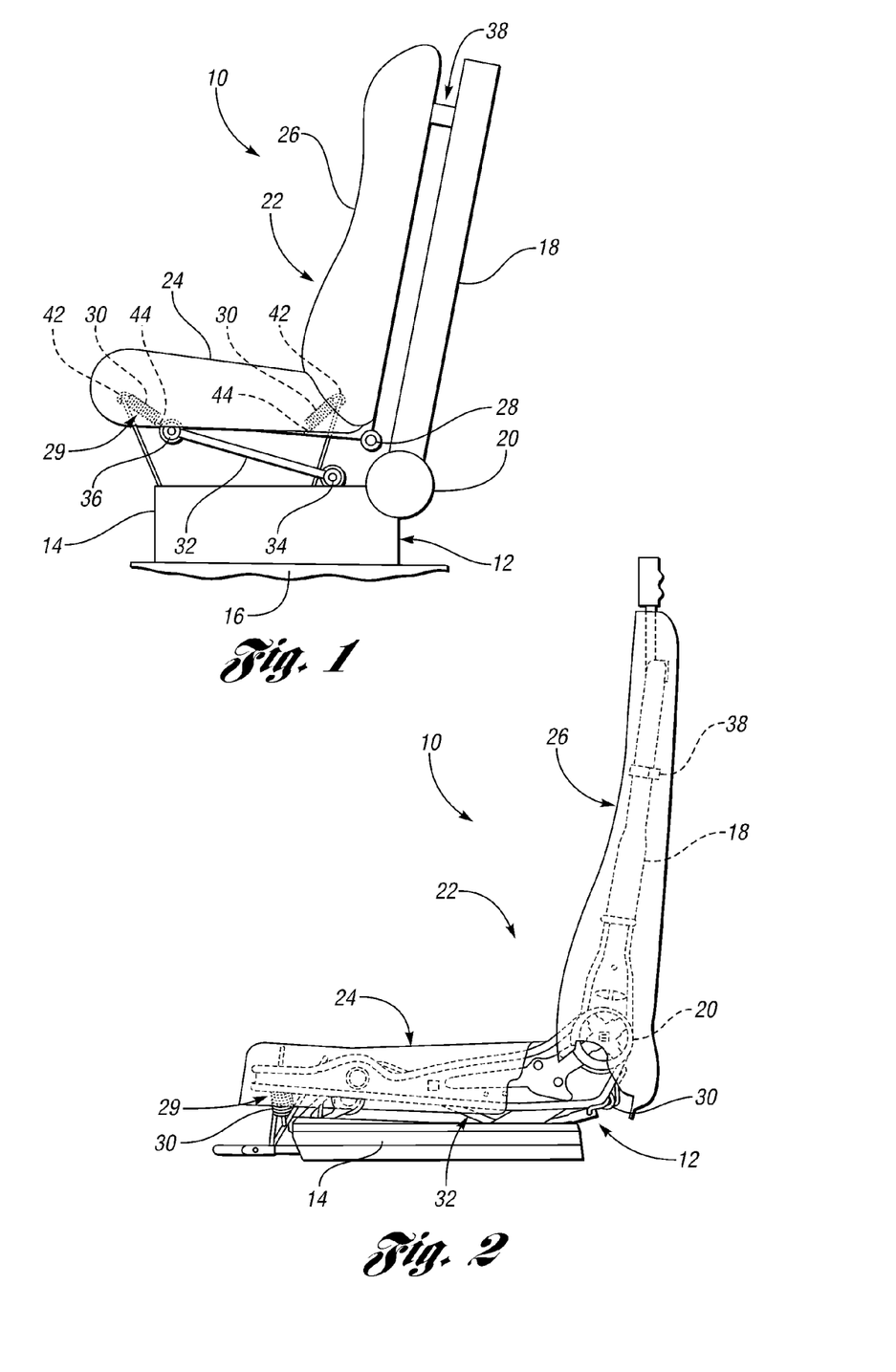
FIG. 1 is a schematic side view of a vehicle seat constructed in accordance with the present invention.
FIG. 2 is a more detailed side view of the vehicle seat with a suspension frame thereof shown in a lower position.
Figure 3:
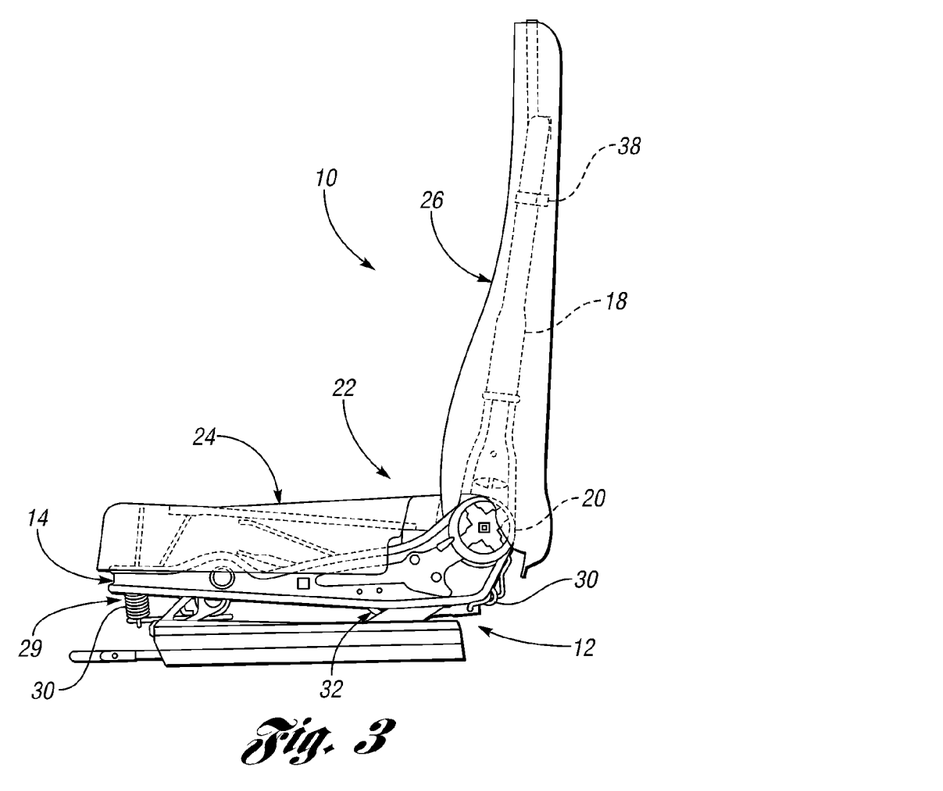
FIG. 3 is a side view of a vehicle seat similar to FIG. 2 but shown in an upper position.

With reference to FIG. 1 of the drawings, a schematically illustrated vehicle seat constructed in accordance with the invention is generally indicated by 10 and includes a support frame 12 having a bottom frame portion 14 for mounting on an associated vehicle floor 16, a back frame portion 18, and a connection 20 for mounting the back frame portion on the bottom frame portion in an upstanding orientation. A suspension frame 22 of the seat has a bottom seating portion 24, a backrest 26, and a pivotal connection 28 that pivotally mounts the backrest on the bottom seating portion for pivotal movement with respect to the bottom seating portion. A spring suspension collectively indicated by 29 is disclosed as four springs 30 (FIG. 5) that suspend the bottom seating portion 24 of the suspension frame at spaced corner location on the bottom frame portion of the support frame for vertical movement between the lower position shown in FIG. 2 and the upper position shown in FIG. 3. A control lever 32 shown in FIG. 1 has at least one pivotal connection 34 to the bottom frame portion 14 of the support frame 12 and pivotal connection 36 to the bottom seating portion 24 of the suspension frame 22 to provide horizontal positioning of the bottom seating portion upon vertical movement of the suspension frame. At the upper extremity of the seat as shown, a slide assembly 38 extends between the backrest 26 of the suspension frame 22 and the back frame portion 18 of the support frame 12 to provide horizontal positioning of the backrest upon vertical movement of the suspension frame.

The connection 20 between the back frame portion 18 and the bottom frame portion 14 of the support frame 12 includes a recliner 40 of any conventional type that permits adjustable pivoting of the back frame portion with respect to the bottom frame portion to a selected angular position desired by the seat occupant. Also, the bottom frame portion 14 of the support frame 12 may have seat adjusters for providing longitudinal, height and tilt adjustment of the support frame.

Figure 5:
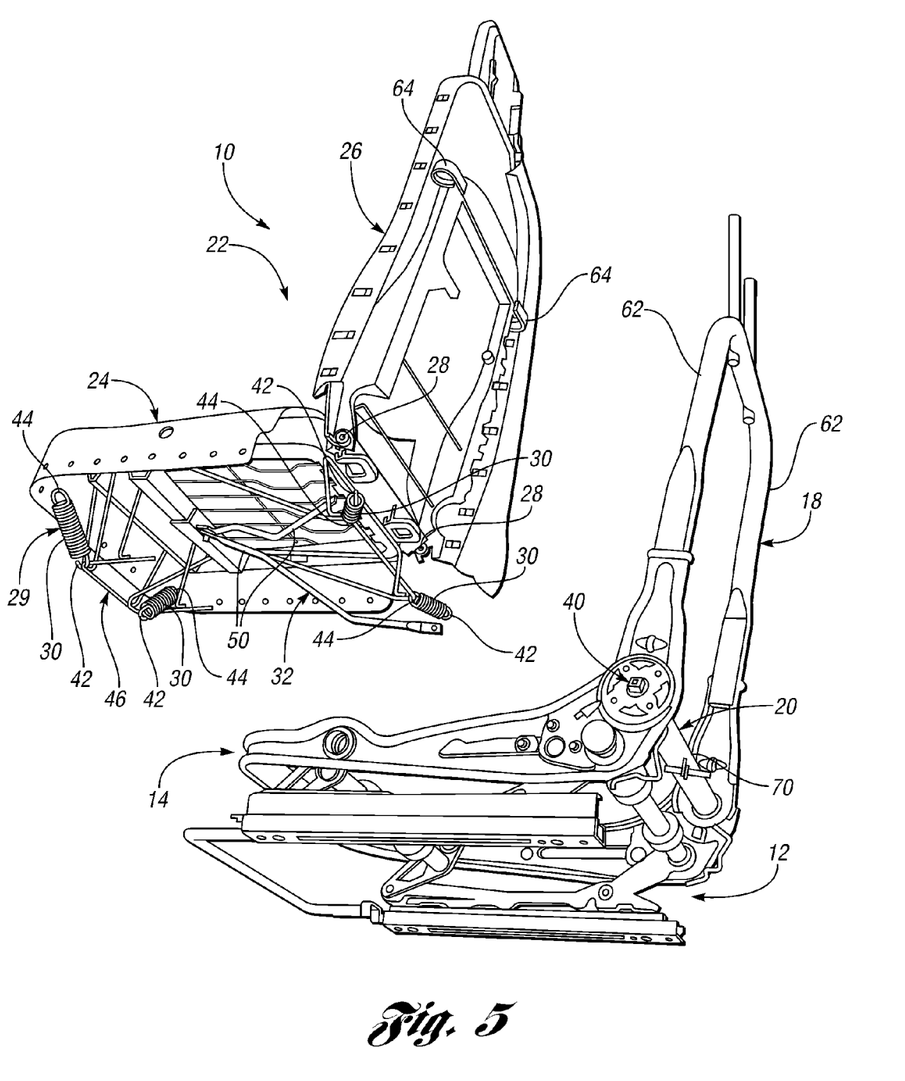
FIG. 5 is an exploded perspective view showing both a support frame for mounting on a vehicle floor and a suspension frame that is mounted on the support frame by springs under the guidance of a control lever as well as the slide assembly.
Figure 6:
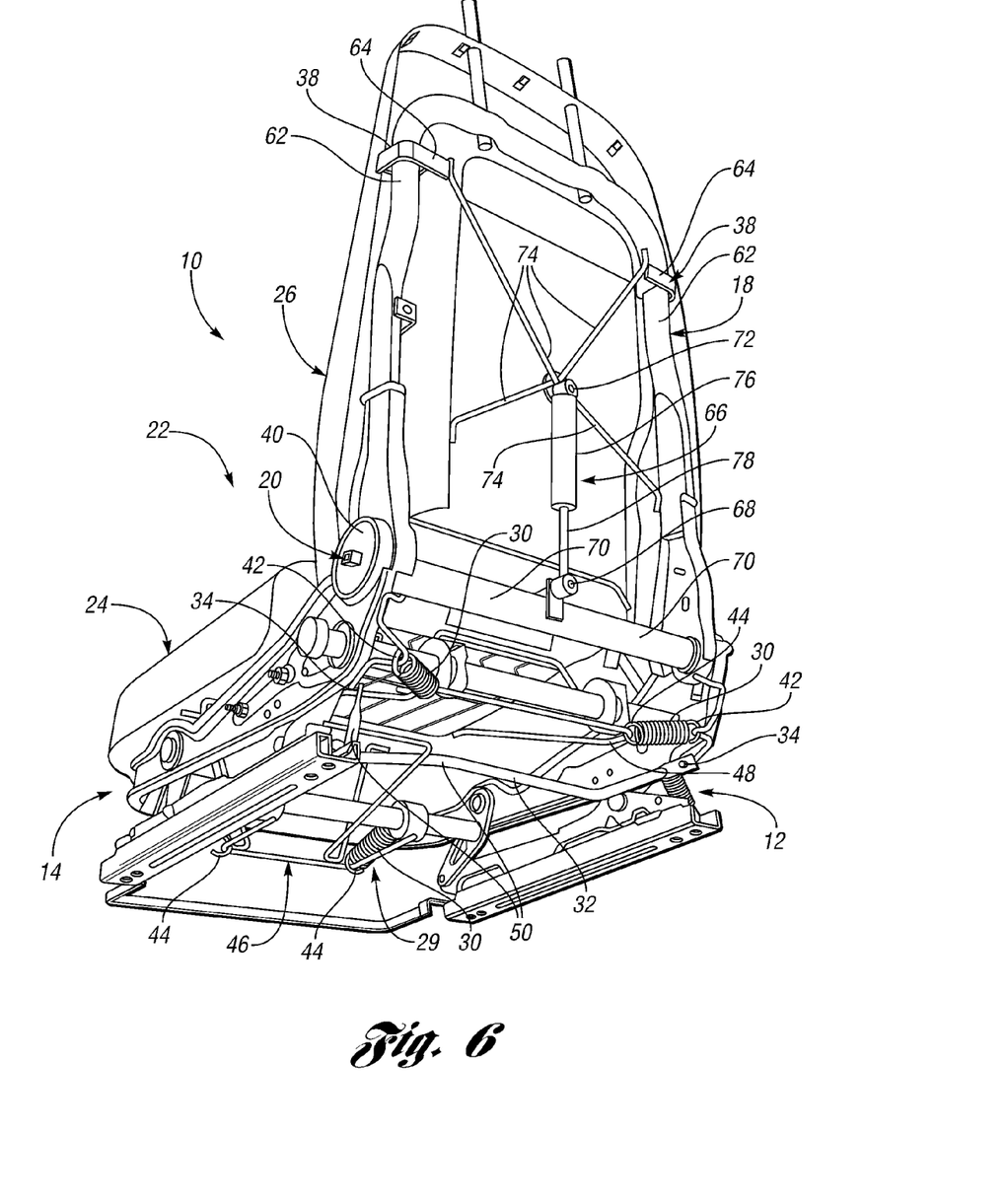
FIG. 6 is a perspective view showing both the support frame and the suspension frame in an assembled condition.

As best shown in FIGS. 5 and 6, the four springs 30 of the spring suspension 29 are embodied as helical springs each of which has a first end 42 connected to the bottom frame portion of the support frame 12 and a second end 44 connected to the bottom seating portion 24 of the suspension frame 22. More specifically, the bottom seating portion 24 of suspension frame 22 as best shown in FIG. 6 includes a connection wire structure collectively indicated by 46 that extends downwardly therefrom and has lower connection locations 48 at which the second ends 44 of the helical springs 30 are connected.

Figure 7:
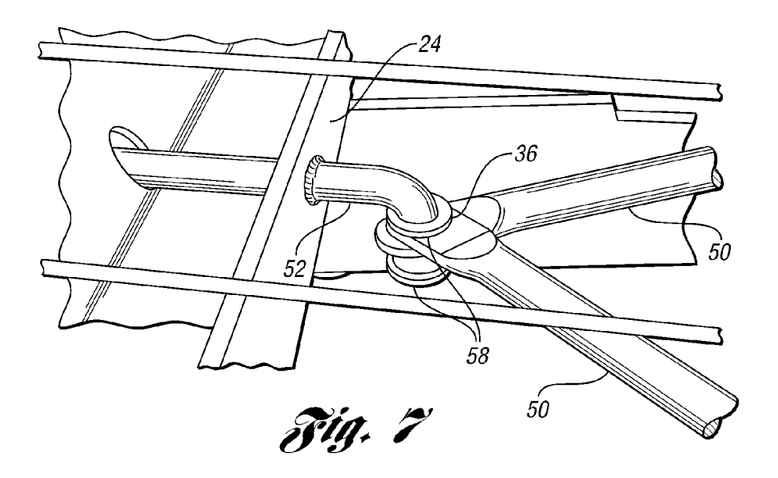
FIG. 7 is a perspective view illustrating a pivotal connection of a vertex of the V-shaped control link to the suspension frame.
Figure 7A:
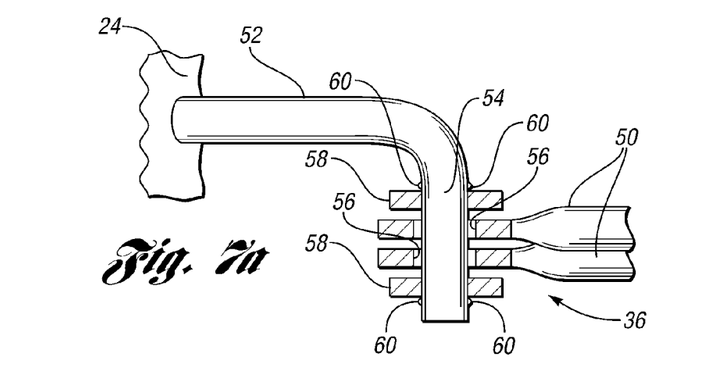
FIG. 7a is a partial elevation view that further illustrates the pivotal connection shown in FIG. 7.

As shown in FIGS. 5, 6 and 7, the control lever 32 includes a pair of control arms 50 that define a generally V shape having a pair of spaced pivotal connections 34 to the bottom frame portion 14 of the support frame 12 and a vertex having the pivotal connection 36 to the bottom seating portion 24 of the suspension frame 22. As best shown in FIGS. 7 and 7a, the pivotal connection of the pair of control arms 50 of the control lever 32 includes a connection rod 52 that extends horizontally from the bottom seating portion 24 of the suspension frame 22 and has a distal extremity 54 that extends vertically. The pair of control arms 50 at the V-shaped vertex have oversized holes 56 that receive the vertically extending distal extremity 54 of the connection rod 52. Lower and upper securement washers 58 secured in any suitable manner such as by deformation 60 capture the ends of control arms 50 which are thus pivotally movable about a generally horizontal axis.

Figure 8:
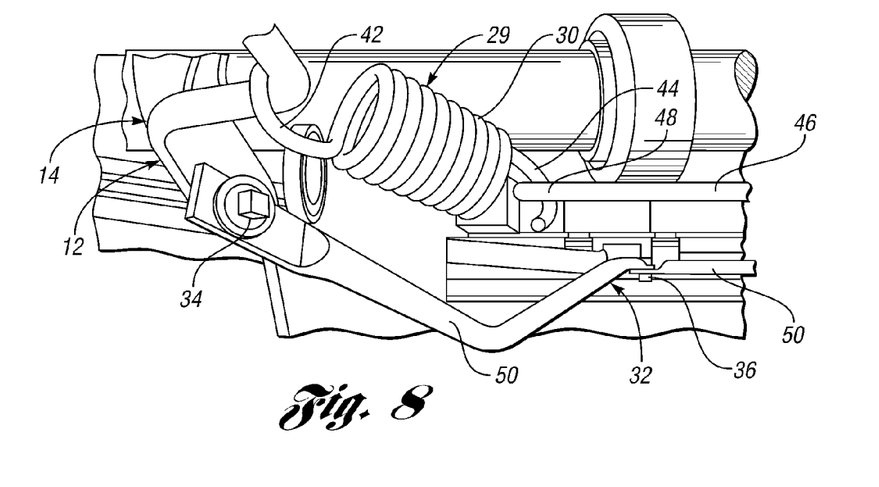
FIG. 8 is a perspective view that illustrates the spring connection between the support frame and the suspension frame and the pivotal connection between the control lever and the support frame.

As best shown in FIGS. 5, 6 and 8, the pair of spaced connection 34 of the pair of control arms 50 to the bottom frame portion 14 of support frame 12 are at rearward locations with respect to the seat and the pivotal connection 36 of the pair of control arms 50 to the bottom seating portion 24 of the suspension frame 22 is at a forward location with respect to the seat.

Figure 4:
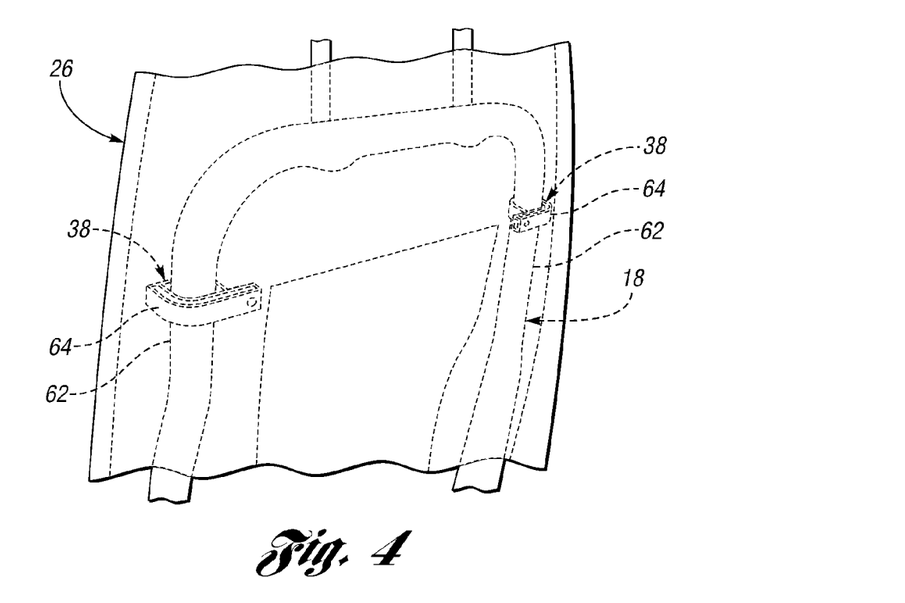
FIG. 4 is a perspective view of a portion of the vehicle seat back showing a slide assembly for controlling horizontal movement as the vehicle seat moves vertically.

As best illustrated in FIG. 4, the slide assembly 38 on the back frame portion 18 of the support frame 12 includes a slideway 62, actually two slideways 62, on the back frame portion 18 of the support frame 12 and a slide 64, actually two slides 64, mounted on the backrest 26 of the suspension frame 22 and slidably supported on the slideway to provide horizontal positioning of the backrest upon vertical movement of the suspension frame.

As shown in FIGS. 5 and 6, the bottom frame portion 14 and the back frame portion 18 of the support frame 12 each have a U shape respectively opening rearwardly and generally downwardly with respect to the seat, and the U-shaped back frame portion 18 of the support frame 12 includes the pair of laterally spaced upper slideways 62 of the slide assembly 38. Furthermore, the bottom seating portion 24 and the backrest 26 of the suspension frame 22 also each have a U shape that respectively open rearwardly and generally downwardly with respect to the seat, and the U-shaped backrest of the suspension frame has a pair of laterally spaced upper slides 64 received by the laterally spaced upper slideways 62 of the U-shaped back frame 18 of the support frame 12 to guide the backrest of the suspension frame during vertical movement. It should be noted that the rearwardly opening U-shaped bottom seating portion 24 of the suspension frame may have a laterally extending support portion 65 as best illustrated in FIG. 5 for providing lateral support at its rearwardly opening shape.

As shown in FIG. 6, the vehicle seat is illustrated as including a backrest spring 66 having one end 68 connected to a laterally extending connecting tube 70 of the support frame connection 20 and having another end 72 connected to the backrest 26 of the suspension frame 22 at connection wires of 74 of the backrest. This spring 66 is constructed as a gas spring including a gas cylinder 76 and a piston connecting rod 78 and functions as both a spring providing suspension and as a damper for providing damping of the suspension frame on the support frame.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
    a support frame including a bottom frame portion for mounting in a generally horizontal orientation on an associated vehicle floor, a back frame portion, and a connection for mounting the back frame portion on the bottom frame portion in a generally upstanding orientation;
    a suspension frame having a bottom seating portion, a backrest and a pivotal connection that pivotally mounts the backrest on the bottom seating portion for pivotal movement with respect thereto;
    a spring suspension for suspending the bottom seating portion of the suspension frame on the bottom frame portion of the support frame for vertical movement, the spring suspension including four springs for suspending the bottom seating portion of the suspension frame at spaced corner location on the bottom frame portion of the support frame for vertical movement;
    a control lever having at least one pivotal connection to the bottom frame portion of the support frame and a pivotal connection to the bottom seating portion of the suspension frame to provide horizontal positioning of the bottom seating portion upon vertical movement of the suspension frame; and
    a slide assembly that extends between the backrest of the suspension frame and the back frame portion of the support frame to provide horizontal positioning of the backrest upon vertical movement of the suspension frame.

2. A vehicle seat as in claim 1 wherein the connection between the back frame portion and the bottom frame portion of the support frame comprises a recliner that permits adjustable pivotal positioning of the back frame portion with respect to the bottom frame portion.

3. A vehicle seat as in claim 1 wherein the four springs comprise helical springs each of which has a first end connected to the bottom frame portion of the support frame and a second end connected to the bottom seating portion of the suspension frame.

4. A vehicle seat as in claim 3 wherein the bottom seating portion of the suspension frame includes a connection wire structure that extends downwardly therefrom and has lower connection locations at which the second ends of the helical springs are connected.

5. A vehicle seat as in claim 1 wherein the control lever includes a pair of control arms that define a generally V shape having a pair of spaced pivotal connections to the bottom frame portion of the support frame and a vertex having the pivotal connection to the bottom seating portion of the suspension frame.

6. A vehicle seat as in claim 5 wherein the pivotal connection of the vertex of the pair of control arms of the control lever includes a connection rod that extends horizontally from the bottom seating portion of the suspension frame and has a distal extremity that extends vertically, and the pair of control arms of the control lever having oversize holes that receive the vertically extending distal extremity of the connection rod.

7. A vehicle seat as in claim 5 wherein the pair of spaced pivotal connections of the pair of control arms of the control lever to the bottom frame portion of the support frame are at rearward locations with respect to the seat and wherein the pivotal connection the vertex of the pair of control arms to the bottom seating portion of the suspension frame is at a forward location with respect to the seat.

8. A vehicle seat as in claim 1 wherein the slide assembly includes a slideway on the back frame portion of the support frame and a slide mounted on the backrest of the suspension frame and slidably supported on the slideway to provide horizontal positioning of the backrest upon vertical movement of the suspension frame.

9. A vehicle seat as in claim 1 wherein the bottom frame portion and the back frame portion of the support frame each having a U shape that respectively open rearwardly and generally downwardly with respect to the seat, the U-shaped back frame portion of the support frame including a pair of laterally spaced upper slideways of the slide assembly, the bottom seating portion and the backrest of the suspension frame also each having a U shape that respectively open rearwardly and generally downwardly with respect to the seat, and the U-shaped backrest of the suspension frame having a pair of laterally spaced upper slides received by the laterally spaced upper slideways of the U-shaped back frame of the support frame to guide the backrest of the suspension frame during vertical movement.

10. A vehicle seat as in claim 1 further including a backrest spring that extends between the back frame portion of the support frame and the backrest of the suspension frame to provide further suspension of the suspension frame on the support frame.

11. A vehicle seat as in claim 1 further including a backrest damper that extends between the back frame portion of the support frame and the backrest of the suspension frame to provide damping of the suspension frame on the support frame.

12. A vehicle seat as in claim 1 further including a backrest gas spring that extends between the back frame portion of the support frame and the backrest of the suspension frame to provide further suspension and damping of the suspension frame on the support frame.

13. A vehicle seat as in claim 1 wherein the connection between the back frame portion and the bottom frame portion of the support frame includes a recliner that permits adjustable pivotal positioning of the back frame portion with respect to the bottom frame portion, the four springs of the spring suspension being four helical springs each of which has a first end connected to an associated corner location of the bottom frame portion of the support frame and a second end connected to the bottom seating portion of the suspension frame, and the bottom seating portion of the suspension frame including a connection wire structure that extends downwardly therefrom and has lower connection locations at which the second ends of the helical springs are connected.

14. A vehicle seat as in claim 13 wherein the control lever includes a pair of control arms that define a generally V shape having a pair of spaced pivotal connections to the bottom frame portion of the support frame and a vertex having the pivotal connection to the bottom seating portion of the suspension frame, the pair of spaced pivotal connections of the pair of control arms of the control lever to the bottom frame portion of the support frame being at rearward locations with respect to the seat, and the pivotal connection of the vertex of the pair of control arms to the bottom seating portion of the suspension frame being at a forward location with respect to the seat.

15. A vehicle seat as in claim 14 wherein the pivotal connection of the vertex of the pair of control arms of the control lever includes a connection rod that extends horizontally from the bottom seating portion of the suspension frame and has a distal extremity that extends vertically, and the pair of control arms of the control lever having oversize holes that receive the vertically extending distal extremity of the connection rod.

16. A vehicle seat as in claim 14 wherein the bottom frame portion and the back frame portion of the support frame each have a U shape that respectively open rearwardly and generally downwardly with respect to the seat, the U-shaped back frame portion of the support frame including a pair of laterally spaced upper slideways of the slide assembly, the bottom seating portion and the backrest of the suspension frame also each having a U shape that respectively open rearwardly and generally downwardly with respect to the seat, and the U-shaped backrest of the suspension frame having a pair of laterally spaced upper slides received by the laterally spaced upper slideways of the U-shaped back frame of the support frame to guide the backrest of the suspension frame during vertical movement.

17. A vehicle seat as in claim 16 further including a backrest gas spring that extends between the back frame portion of the support frame and the backrest of the suspension frame to provide further suspension and damping of the suspension frame on the support frame.

\* \* \* \* \*

UNITED STATES PATENT AND TRADEMARK OFFICE
CERTIFICATE OF CORRECTION

PATENT NO. : 8,317,266 B2
APPLICATION NO. : 12/742307
DATED : November 27, 2012
INVENTOR(S) : Adam Alfredsson It is certified that error appears in the above-identified patent and that said Letters Patent is hereby corrected as shown below:

Column 5, Line 25, Claim 1:

After "at spaced corner"
Delete "location" and
Insert -- locations --.

Signed and Sealed this
Twenty-sixth Day of March, 2013

Teresa Stanek Rea
*Acting Director of the United States Patent and Trademark Office*